United States Patent
van der Merwe et al.

(10) Patent No.: US 10,001,121 B2
(45) Date of Patent: Jun. 19, 2018

(54) SYSTEM AND METHOD FOR OPERATING A PUMP

(71) Applicant: Franklin Electric Company, Inc., Fort Wayne, IN (US)

(72) Inventors: Lyon van der Merwe, Oriel (ZA); Don Brown, Fort Wayne, IN (US); Paul Luarde, Fort Wayne, IN (US)

(73) Assignee: Franklin Electric Co., Inc., Fort Wayne, IN (US)

(*) Notice: Subject to any disclaimer, the term of this patent is extended or adjusted under 35 U.S.C. 154(b) by 226 days.

(21) Appl. No.: 14/776,204

(22) PCT Filed: Mar. 14, 2014

(86) PCT No.: PCT/US2014/027781
§ 371 (c)(1),
(2) Date: Sep. 14, 2015

(87) PCT Pub. No.: WO2014/143708
PCT Pub. Date: Sep. 18, 2014

(65) Prior Publication Data
US 2016/0003242 A1    Jan. 7, 2016

Related U.S. Application Data

(60) Provisional application No. 61/792,085, filed on Mar. 15, 2013.

(51) Int. Cl.
*G05D 11/00* (2006.01)
*F04C 28/08* (2006.01)
(Continued)

(52) U.S. Cl.
CPC ............ *F04C 28/08* (2013.01); *E21B 43/006* (2013.01); *E21B 43/121* (2013.01);
(Continued)

(58) Field of Classification Search
CPC ... F04D 15/0088; F04B 49/02; G05B 13/048; E21B 21/08; E21B 43/121; E21B 43/127;
(Continued)

(56) References Cited

U.S. PATENT DOCUMENTS 6,041,856 A * 3/2000 Thrasher ............... E21B 43/121
166/53
6,045,333 A    4/2000 Breit
(Continued)

FOREIGN PATENT DOCUMENTS

CA    2713745    2/2011
RU    2181829    4/2002
(Continued)

OTHER PUBLICATIONS

International Search Report and Written Opinion for PCT Application No. PCT/US2014/027781, 2 pgs.

*Primary Examiner* — Tuan Vu
(74) *Attorney, Agent, or Firm* — Faegre Baker Daniels LLP

(57) ABSTRACT

A pumping system and method for operating a pumping system including a motor coupled to a variable speed drive to drive a pump. A torque indicator corresponding to the torque presented to the drive is determined. The torque indicator may be used to detect a fault if it exceeds a baseline torque, or to detect a defective transducer, or to detect a system change by perturbing one parameter and comparing another to a predicted value.

23 Claims, 6 Drawing Sheets

(51) Int. Cl.

| | | |
|---|---|---|
| *F04C 14/08* | (2006.01) | |
| *F04C 13/00* | (2006.01) | |
| *F04C 14/28* | (2006.01) | |
| *E21B 43/00* | (2006.01) | |
| *E21B 43/12* | (2006.01) | |
| *F04C 2/107* | (2006.01) | |
| *F04C 18/107* | (2006.01) | |
| *G05B 13/04* | (2006.01) | |

(52) U.S. Cl.
CPC .......... *E21B 43/128* (2013.01); *F04C 2/1071* (2013.01); *F04C 13/008* (2013.01); *F04C 14/08* (2013.01); *F04C 14/28* (2013.01); *F04C 18/1075* (2013.01); *G05B 13/048* (2013.01); *F04C 2270/035* (2013.01); *F04C 2270/80* (2013.01)

(58) Field of Classification Search
CPC ...... E21B 47/042; E21B 43/126; F04C 28/08; F04C 2270/035; A61B 5/0031; G01N 33/2823
See application file for complete search history.

(56) References Cited

U.S. PATENT DOCUMENTS

| 6,494,685 | B2 | 12/2002 | Carstensen |
| 6,531,842 | B2 | 3/2003 | LeDoux et al. |
| 6,889,781 | B2 | 5/2005 | Mazorow |
| 7,437,215 | B2 | 10/2008 | Anderson et al. |
| 7,869,978 | B2 | 1/2011 | Anderson et al. |
| 8,152,492 | B2 | 4/2012 | Beck et al. |
| 2003/0163259 | A1* | 8/2003 | DiFoggio ............ G01N 33/2823 702/6 |
| 2004/0062658 | A1* | 4/2004 | Beck .................... E21B 43/126 417/42 |
| 2007/0212229 | A1 | 9/2007 | Stavale et al. |
| 2008/0041149 | A1* | 2/2008 | Leuchtenberg ......... E21B 21/08 73/152.21 |
| 2008/0067116 | A1* | 3/2008 | Anderson ............. E21B 47/042 210/100 |
| 2008/0190604 | A1 | 8/2008 | Hild et al. |
| 2008/0240932 | A1 | 10/2008 | Carstensen |
| 2010/0034665 | A1 | 2/2010 | Zhong et al. |
| 2011/0181431 | A1* | 7/2011 | Koehl ................ F04D 15/0088 340/660 |
| 2011/0186353 | A1* | 8/2011 | Turner ................ G05B 13/048 175/40 |
| 2011/0226470 | A1 | 9/2011 | Latrille et al. |
| 2012/0101788 | A1 | 4/2012 | Kallesoe |
| 2012/0177504 | A1 | 7/2012 | Beck et al. |
| 2012/0302854 | A1* | 11/2012 | Kamath ............... A61B 5/0031 600/365 |
| 2013/0140912 | A1* | 6/2013 | Nirenberg ............... F04B 49/02 307/118 |
| 2013/0151216 | A1* | 6/2013 | Palka .................... E21B 43/127 703/2 |
| 2013/0277063 | A1* | 10/2013 | Palka .................... E21B 43/121 166/370 |

FOREIGN PATENT DOCUMENTS

| RU | 2341004 | 12/2008 |
| WO | WO2014/175769 | 10/2014 |

\* cited by examiner

SYSTEM AND METHOD FOR OPERATING A PUMP

CROSS-REFERENCE TO RELATED APPLICATIONS

This is a National phase application of International Patent Application No. PCT/US2014/027781, filed on Mar. 14, 2014, which claims the benefit of priority from U.S. Provisional Patent Application No. 61/792,085, filed on Mar. 15, 2013, entitled "SYSTEM AND METHOD FOR OPERATING A PUMP," said applications expressly incorporated herein by reference in their entirety.

TECHNICAL FIELD

The disclosure relates generally to methods and systems to control pumping systems including variable speed drives. More particularly, the disclosure relates to torque control methods and systems implementing said methods.

BACKGROUND OF THE DISCLOSURE

A pumping system includes a pump, a motor and a motor controller. Motor controllers enable effective control of pumps responsive to changing system conditions. These systems can be used to pump fluids from deep wells such as coal bed methane (CBM) and coal seam gas (CSG) wells. Referring to FIG. 1., a basic CBM/CSG vertical well includes tubing run below the deepest coal interval. After fracture stimulation, if required, water flows from the coal seam, travels down through the annulus and is pumped out through the tubing. Methane—desorbed or liberated from the coal matrix—flows into the annulus between the casing and the tubing and rises to the surface where it is piped to a compressor station and combined with production from other wells. Water may be produced as well, which can either be reinjected into a deeper formation or treated and disposed. An electrical submersible progressing cavity pump may be used.

The components of an exemplary CBM/CSG pumping installation are shown in FIG. 2. From the bottom up, the installation includes an electric motor close coupled to a pump. These components are centralized with the aid of centralizers, strategically placed along the total installed length. The motor is powered by a motor lead fed from the surface. Power to the motor is obtained from a motor controller. Water is transported to the surface along the installed drop pipe whilst gas travels up along the casing or annulus (space between the casing and the drop pipe. Water and gas are ejected at surface and collected via surface piping to a central point. A transducer is shown hanging from a transducer cable. Exemplary transducers include pressure and level transducers and/or sensors. The transducer may detect the level of the water in the well or may detect other variables operable to determine the water level. The pumping station is operated to deliquify the well while maintaining adequate suction pressure and backpressure requirements of the well. Managing bottom-hole pressure and deliquification of the well can significantly increase productivity.

Dry-run or pump-off conditions and entrained gasses are harmful and difficult conditions to guard against since CBM/CSG applications require pumping wells down to levels close to the pump intake. This is done to reduce bottom-hole pressure as much as possible. Several conditions make the detection of dry-running difficult, including entrained gas in the water and annulus pressure that may be variable and substantially of the same order of magnitude as the water column pressure. The complexity of determining the water level at levels close to the coal seams or sources of gas that cause increased levels of entrained gas makes it difficult to avoid dry-run or pump-off conditions when relying on bottom-hole pressure measurements. While the pump setting is often below the gas producing zones to avoid gas entering the pump, this is not always possible where pumps are installed in horizontal wells or where gas production levels exceed original expectations.

One of the main concerns with CBM applications is a scenario in which the pump runs for extended time periods either dry or with high free gas production through the pump. This generally results in premature pump failure. Free gas may enter the pump when the fluid level is drawn down to the pump intake, which may occur when the pumping rate exceeds the in-flow rate. Using transducers to determine suction pressure, shaft torque and low water levels is not always possible or practical. Models can be used to determine operating conditions, but changing operating conditions may cause pump characteristics to vary. One example of changing characteristics is pump wear caused by solids in the water. Changes in the liquid, such as gas and particle content, density, debris and other factors make the use of transducers a challenge.

There is a need to provide improved controls to manage pumping systems, particularly in difficult or hard to reach environments.

SUMMARY OF DISCLOSED EMBODIMENTS

Disclosed herein are embodiments of a pumping system and a method for operating a pump. In one embodiment of the pumping system, the pumping system comprises a pump and a motor coupled to a variable speed drive to drive the pump. The variable speed drive includes a processor and a non-transitory computer readable medium having embedded therein processing instructions configured to perform a method when executed by the processor. The method executed by the processor comprises: periodically measuring a fluid parameter with a transducer; controlling the pump based on the fluid parameter; correlating the fluid parameter and a motor torque indicator selected from torque, power and current; predicting a value of the torque indicator or the fluid parameter based on the correlation; comparing the predicted value to an actual value of the torque indicator or the fluid parameter; and if the comparison exceeds a prediction threshold, controlling the pump based on the torque indicator.

In one embodiment of a method for operating a pump, the method comprises driving a pump with a motor coupled to a variable frequency drive; periodically measuring a fluid parameter with a transducer; controlling the pump based on the fluid parameter; and correlating the fluid parameter and a motor torque indicator selected from torque, power and current. The method further comprises predicting a value of the torque indicator or the fluid parameter based on the correlation; comparing the predicted value to an actual value of the torque indicator or the fluid parameter; and if the comparison exceeds a prediction threshold, controlling the pump based on the torque indicator.

In another embodiment of the pumping system, the pumping system comprises a pump and a motor coupled to a variable frequency drive to drive the pump. The variable frequency drive includes a processor and a non-transitory computer readable medium having embedded therein processing instructions configured to perform a method when executed by the processor. The method executed by the processor comprises: correlating a first parameter and a second parameter, the first parameter and the second parameter varying over time; predicting the first parameter based on a perturbation of the second parameter and the correlation; perturbing the second parameter; measuring a value of the first parameter with a transducer; and detecting a system change based on a difference between the predicted value and the measured value of the first parameter.

In another embodiment of a method for operating a pump, the method comprises driving a pump with a motor coupled to a variable frequency drive; correlating a first parameter and a second parameter, the first parameter and the second parameter varying over time; predicting the first parameter based on a perturbation of the second parameter and the correlation; perturbing the second parameter; measuring a value of the first parameter with a transducer; and detecting a system change based on a difference between the predicted value and the measured value of the first parameter.

In a further embodiment of the pumping system, the pumping system comprises a pump and a motor coupled to a variable frequency drive to drive the pump. The variable frequency drive includes a processor and a non-transitory computer readable medium having embedded therein processing instructions configured to perform a method when executed by the processor. The method executed by the processor comprises: determining a torque indicator comprising one of torque, motor power and motor current; determining the torque indicator during a fault calibration period to determine a baseline; setting a fault threshold based on the baseline; and after setting the fault threshold, detecting a fault if the torque indicator exceeds the fault threshold.

In a further embodiment of a method for operating a pump, the method comprises: driving a pump with a motor coupled to a variable speed drive; determining a torque indicator comprising one of torque, motor power and motor current; determining the torque indicator during a fault calibration period to determine a baseline; setting a fault threshold based on the baseline; and after setting the fault threshold, detecting a fault if the torque indicator exceeds the fault threshold.

BRIEF DESCRIPTION OF THE DRAWINGS

The above-mentioned and other disclosed features, the manner of attaining them, and the advantages thereof, will become more apparent and will be better understood by reference to the following description of disclosed embodiments taken in conjunction with the accompanying drawings, wherein.

Figure 1:
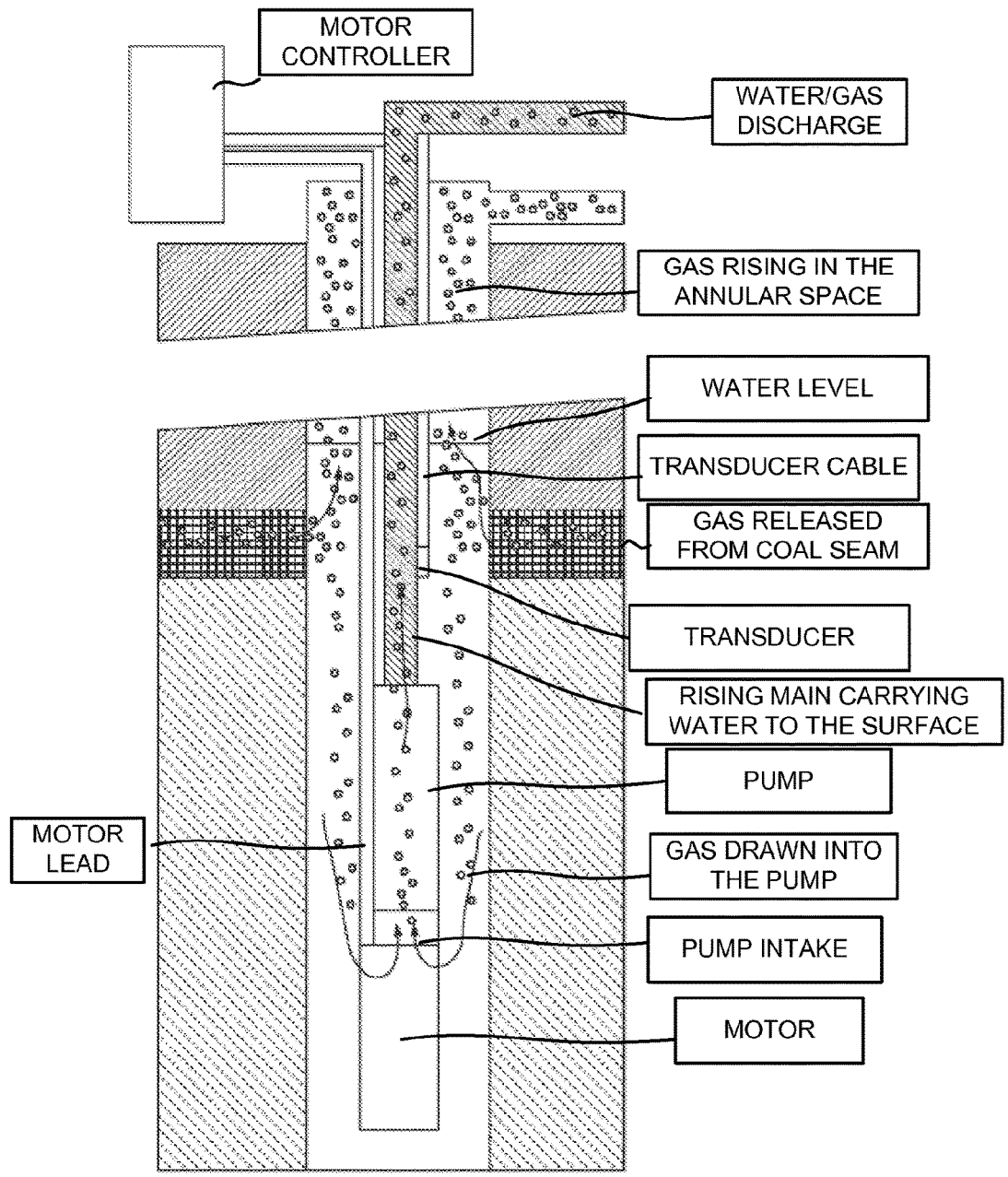
FIG. 1 is a diagram of a coal based methane well.
Figure 2:
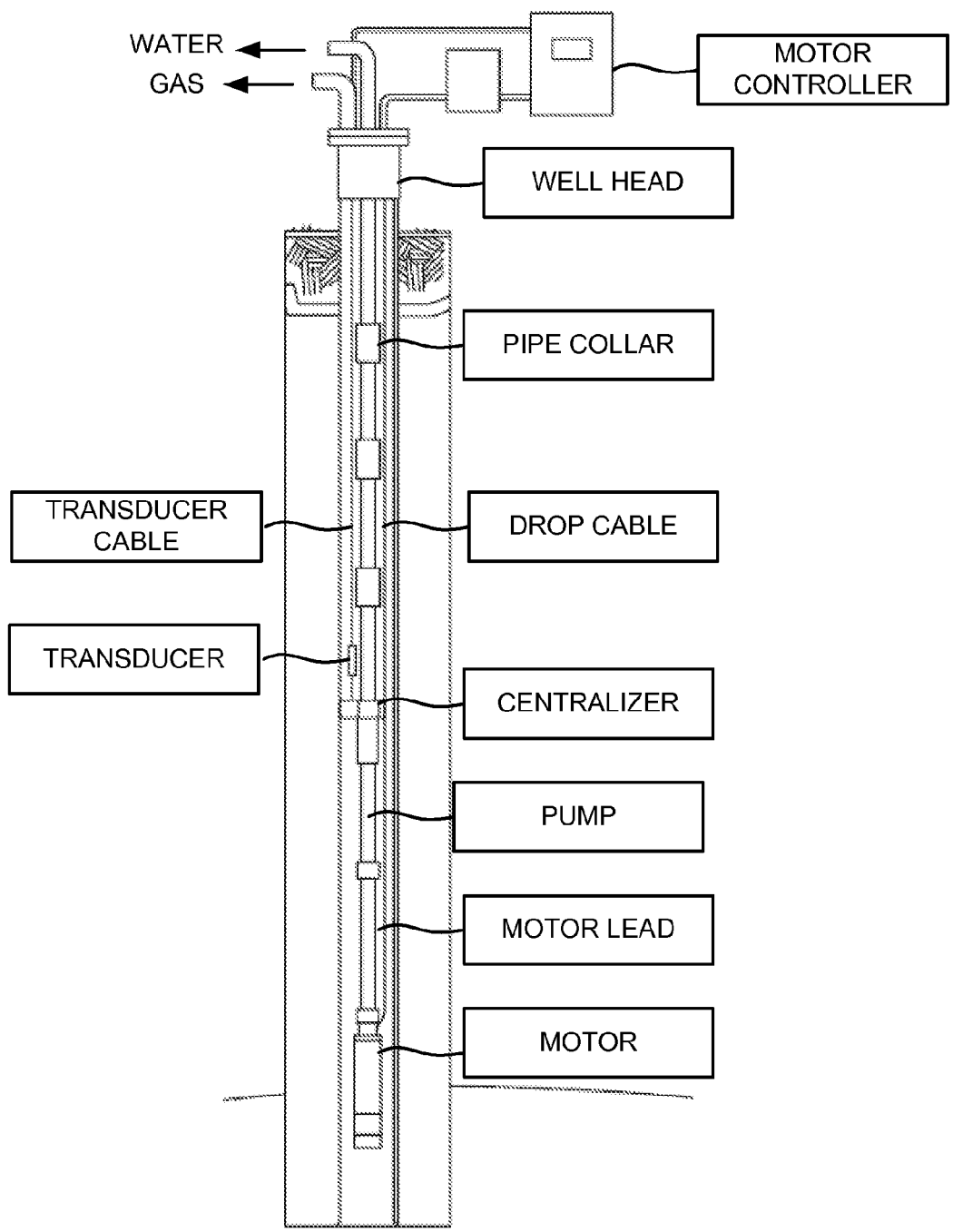
FIG. 2 is a diagram of a pumping installation in the coal based methane well of FIG. 1.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present invention. The exemplification set out herein illustrates embodiments of the disclosure, and such exemplifications are not to be construed as limiting the scope of the invention in any manner.

DETAILED DESCRIPTION OF EXEMPLARY EMBODIMENTS OF THE INVENTION

Generally, a system for operating a pump includes a pump and a motor coupled to a variable speed drive to drive the pump. Exemplary variable speed drives include variable frequency drives. The variable speed drive provides operating parameters of the system, including voltage and current. If the variable speed drive is a variable frequency drive, the frequency relates to the speed of the pump. In other drives, the motor's voltage may be indicative of speed. Therefore, the speed of the pump and the motor's current, as well as the motor torque, are derivable from the drive's operating parameters. In disclosed embodiments of the invention, the operating parameters and transducer signals are characterized during normal operation of the pumping system. Parameters are then predicted, and the predictions are compared to actual values to determine whether the transducer has become damaged, to control the speed of the pump, and to determine dry-run or pump-off conditions, for example.

The system and method described herein can be used in different applications in addition to CBM/CSG applications. Various forms of pumping equipment may be used in accordance with the disclosed embodiments to move fluids from wells and other sources to a targeted alternative location. Exemplary pumping applications include conventional and shale gas, oil, oil-stripper, mine deliquification and deliquification prior to mining. Additional applications may include water including irrigation systems, waste water and water treatment, chemicals and any other system in which pumps are used to move liquids.

Embodiments of the method may be implemented in a pumping assembly including a progressing cavity pump to pump water from an encased well. The pumping assembly has to operate at least at a minimum flow rate to achieve a minimum vertical tubing flow velocity to cause solids to flow upwards and away from the pumping assembly. The pumping rate has to be controlled to prevent dry-running or a pump-off condition. Dry-running can damage a typical progressing cavity pump operating at the suggested speeds (<3,000 rpm) in less than 10 seconds. Since water level in the well is usually proportional to the pressure, and hence the torque that a progressing cavity pump would operate at, the torque that the pump presents to the motor exhibits a substantially linear relationship to the water level. The relationship, or correlation, can be established by measuring the water level with a transducer. Thus, torque can be used to predict the water level. In a motor driven by a variable frequency drive, torque may be calculated as follows:

$$T = \frac{\sqrt{3} \times V \times I \times PF}{\omega}$$

T—Torque
V—Voltage
I—Current
PF—Power Factor
ω—rotational speed

The torque also has a proportional relationship to the motor's current and is influenced by the actual operating point as well. As an illustration, the current is also influenced by the speed or rather total load on the shaft. Additionally, the load and magnetization component of the current are to be separated so that the load component can be used to establish the correlation. Thus, current can be used to predict water level under unchanging system conditions. Furthermore, water level may be predicted by refining the correlation with additional information.

Figure 3:
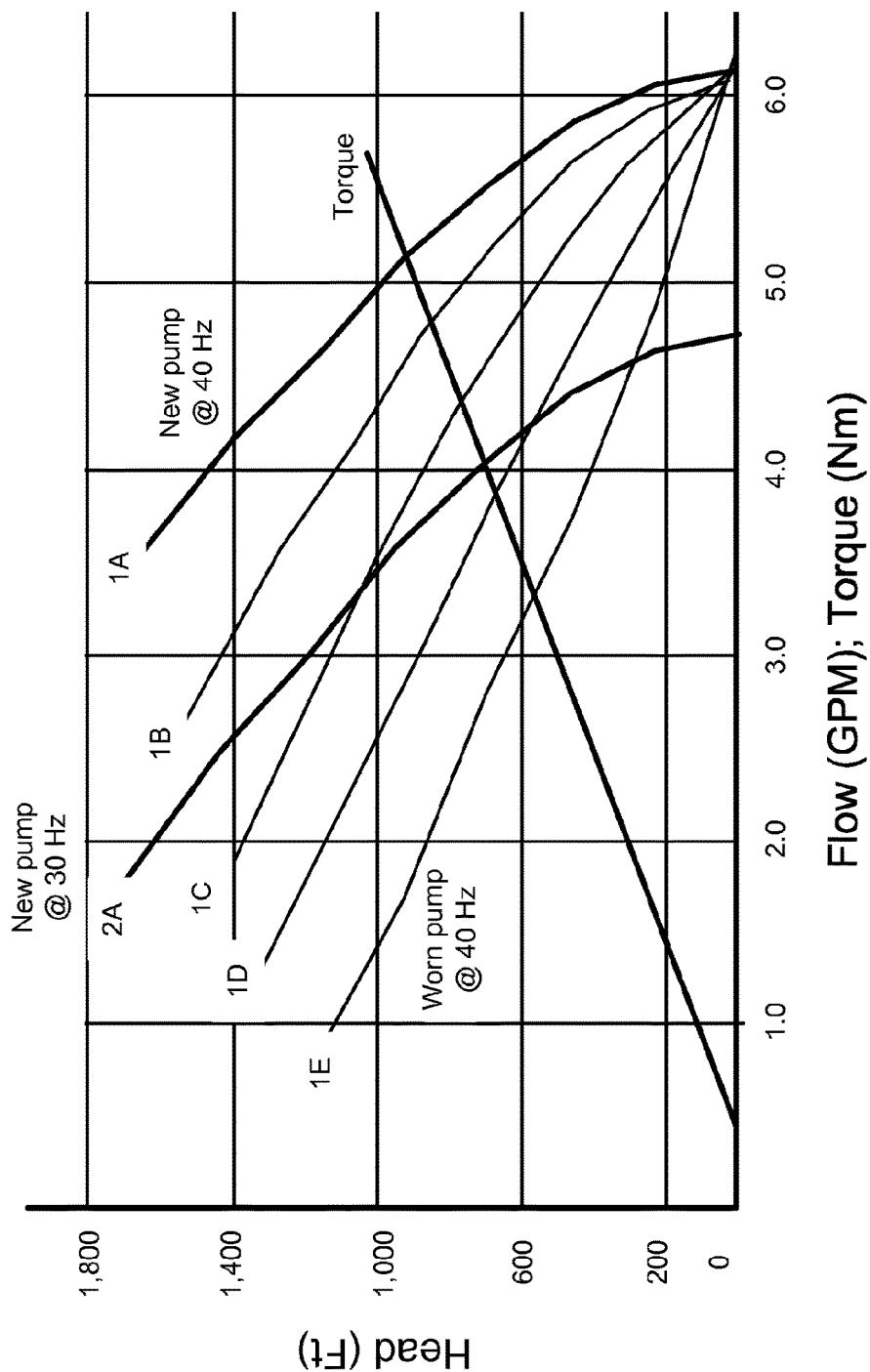
FIG. 3 is a graph of head vs. flow illustrating a control strategy in accordance with a further embodiment set forth in the disclosure.

As the water level in a well measured from the surface decreases (presenting the pump with an increasing head/pressure to pump against), the torque presented to the motor increases. FIG. 3 is a graph illustrating an exemplary relationship between torque, flow and pressure, or head. Torque is represented by a straight line crossing the horizontal axis at a torque of about 0.5 Nm. Torque increases proportionally with head irrespective of wear. At a head of about 1,000 feet, torque equals about 5.5 Nm. The graph also shows multiple flow curves, labeled 1A-1E, corresponding to a frequency, of a variable frequency drive, equal to 40 Hz. At a head of 0 ft., there is no flow. As head increases, flow also increases. However, as can be seen at a head of 600 feet, for example, more flow is generated under curve 1A (~5.6 gpm) corresponding to a new pump, than under curve 1E (~3.2 gpm) corresponding to a worn pump. Curve 2A corresponds to a new pump operating at a slower speed, 30 Hz. As expected, a slower speed generates less flow. Noticeably, the graph illustrates that when head, or water level, is known, torque can be predicted, and speed can be adjusted to produce a desired, and predictable, flow. Conversely, if torque is known, head can be predicted for a given flow and pump wear.

In one embodiment, a variable frequency drive controls a pump to produce a desired flow based on a pump model that includes the curve described with reference to FIG. 3. An exemplary variable frequency drive will be described with reference to FIG. 4. In one example, the variable frequency drive selects a speed based on torque to achieve a desired flow. The torque value corresponding to the flow is selected based on a curve representing the wear level of the pump, which can be determined empirically, can be based on a standard model and can be based on a calibrated model, based on initial measurements. In other embodiments, a DC variable speed drive or other drives may be used to model the torque/head relationship.

Figure 4:
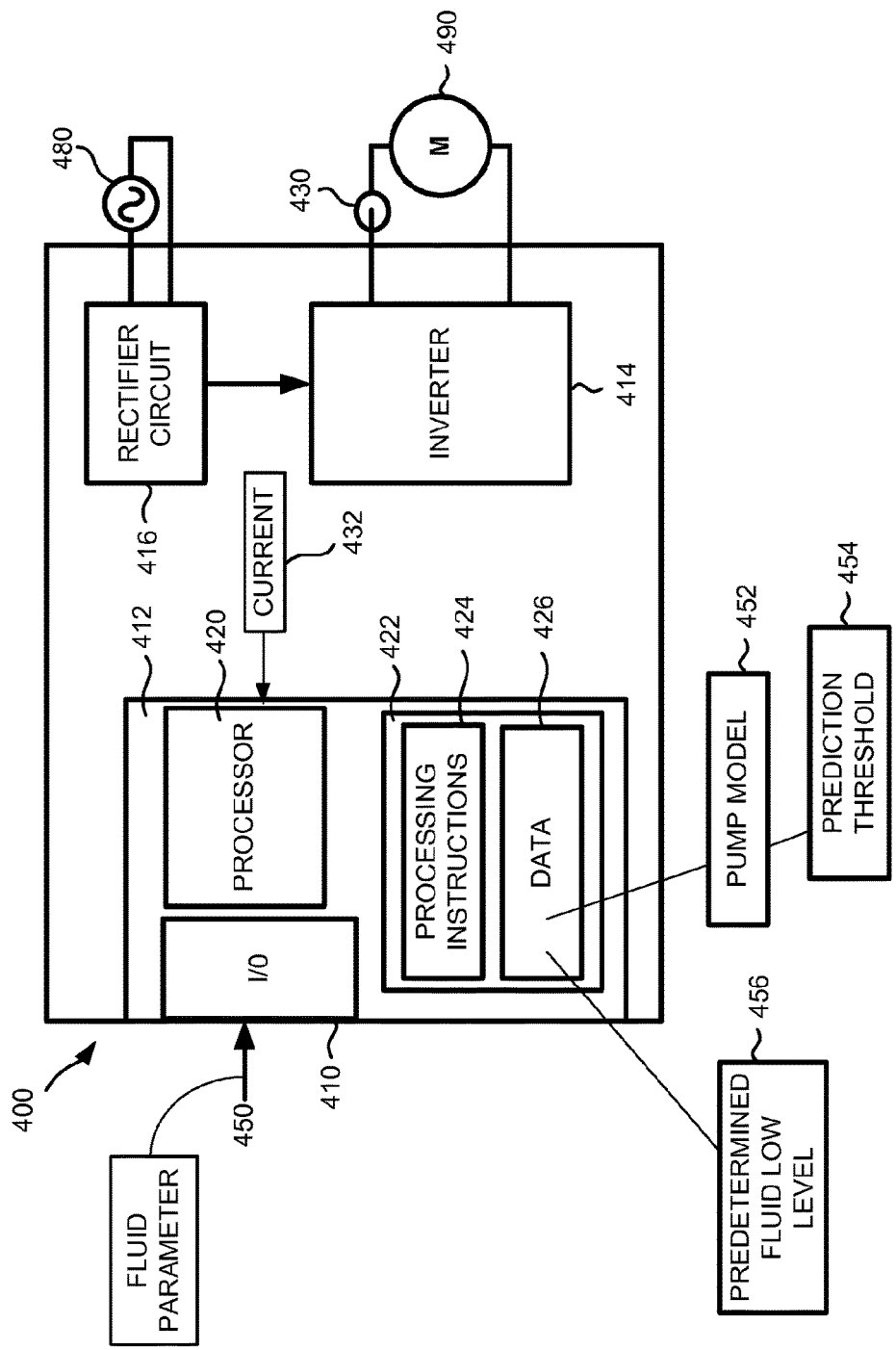
FIG. 4 is a block diagram of a variable frequency drive in accordance with an embodiment set forth in the disclosure.

Embodiments of a method described herein can be implemented with a variable frequency drive (VFD). FIG. 4 is a block diagram of an exemplary variable frequency drive, illustratively VFD 400, receiving power from a source 480 to drive a motor 490 based on a parameter 492 provided to control the drive. Exemplary parameters include speed, water level, water pressure, and the like. Control signals are received through I/O interface 410. An exemplary fluid parameter signal 450 is shown. VFD 400 also includes a processing unit, illustratively processing unit 412, transmits control signals to an inverter 414 which generates the voltage for motor 490. Inverter 414 is powered by a rectifier circuit 416. Processing unit 412 includes a processor 420 configured to access non-transitory computer readable storage 422 and execute processing instructions 422 based on data 426. In one example, processing instructions 422 comprise firmware stored in read only memory (ROM) while data 426 is stored in random access memory (RAM). A current transformer 430 generates a current signal 432 which is provided to processor 420. As shown, data 426 includes a pump model 452, a prediction threshold 454, and a predicted fluid low level 456.

Techniques for generating motor voltages according to characteristics of a control voltage are known in the art. In one example, a technique comprises storing values in a table corresponding to samples of an operating curve. The operating curve is typically a substantially straight line defining a volts-hertz relationship. When the speed control system determines a desired operating speed, which defines an operating frequency, the drive unit looks up a voltage corresponding to the frequency. The drive unit then generates a motor voltage based on the voltage and the frequency. In another example, a formula or a function embodying the operating curve characteristics is used by processor 420 to generate the desired motor voltages. In one variation, data 426 includes one or more volts/hertz tables operable to generate motor voltages according to one or more operating models. Similarly, the pump model may be used to define tables that correlate the torque indicator and/or the fluid parameter to the frequency of the drive.

Figure 5:
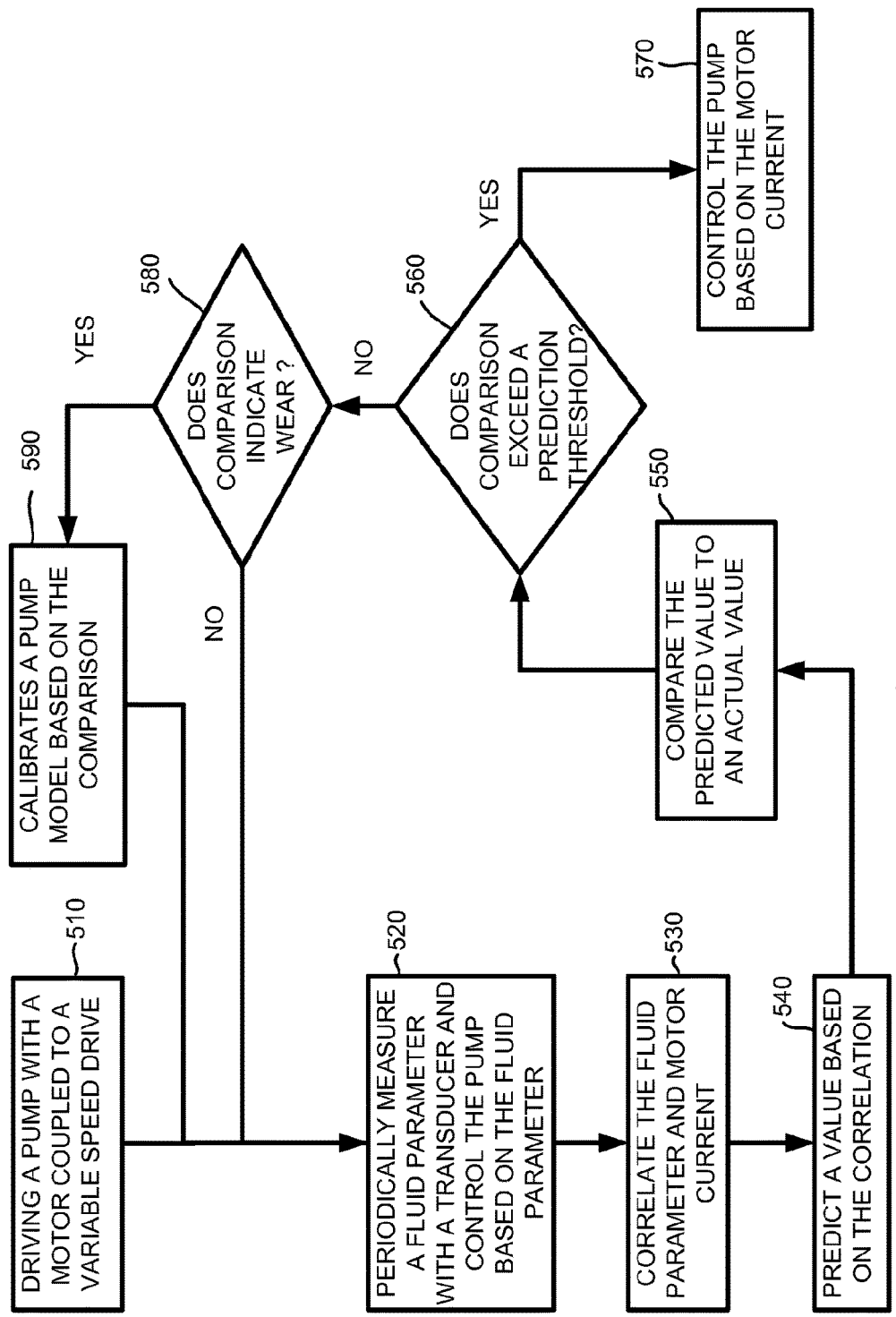
FIG. 5 is a flow chart of a pump control method in accordance with an embodiment set forth in the disclosure.

FIG. 5 is a flowchart, denoted by numeral 500, of an embodiment of the method to operate the pumping system. The method is implemented with a VSD having processing instructions stored in non-transitory computer readable memory. The instructions cause a processor to implement the method. An exemplary VSD is VFD 400. The method begins at 510, with driving the pump with a motor coupled to the variable speed drive.

At 520, the processing instructions cause the processor to periodically measure a fluid parameter with a transducer and to control the pump based on the fluid parameter. The fluid parameter may be, for example, pressure or fluid level. Thus, for example, the VSD can monitor the fluid level with a level transducer and control the motor to maintain the level.

At 530, the processing instructions cause the processor to correlate the fluid parameter and motor current and, optionally, torque. This is achieved, for example, by correlating the level and the motor's torque to generate a curve as shown in FIG. 3. In another variation, a current correlation is made where the load and magnetization component of the current are separated and the load component used to generate a similar curve as FIG. 3 where head corresponds to torque.

At 540, the processing instructions cause the processor to predict a value based on the correlation. This is achieved, for example, by computing the volume of water pumped over a period of time, and then predicting a water level by translating the amount of water to a level difference based on well parameters, and adding the difference to the previous level. The prediction can be of a water level, current or torque, for example.

At 550, the processing instructions cause the processor to compare the predicted value to an actual value and, at 560, to determine if the comparison exceeds a predetermined prediction threshold. The predetermined prediction threshold accounts for measurement variation and can be determined experimentally and adjusted to prevent false positive determinations. If the comparison exceeds a predetermined prediction threshold, it may be inferred that a valid signal is not being received from the transducer.

At 570, the processing instructions cause the processor to control the pump based on the motor torque or current if the comparison exceeds the threshold. In other words, the pump is controlled based on transducer signals and, simultaneously, the signals are correlated to a control parameter such as torque or current. Control parameter predictions are also made, which are compared to the signals. When the signals deviate from the predictions, the VSD determines that the transducer is defective and switches control modes so as to not rely on the transducer. Thereafter, the VSD controls based on the control parameter, e.g. torque or current. Referring to FIG. 3, the VFD may compare torque and level (head) values to the curves. When the actual values deviate significantly from the curves, then the VFD determines that the transducer is defective.

In one variation, there is no transducer available to determine fluid level or pressure downhole. In this instance, there are preloaded values in the processor that define the relationship between level and torque. The system operates in a "sensorless" mode, estimating fluid level or pressure based upon this pre-defined relationship.

In one variation, the VFD determines, at 580, whether the comparisons indicate wear. The comparisons represent deviations over time. Based on the patterns of the deviations, if any, the VFD may determine that the patterns are indicative of wear. For example, the deviations may increase gradually over time, or may increase in predetermined amounts. With reference again to FIG. 3, the deviations may indicate that the pump is gradually shifting from curve 1A to curve 1B. If so, then at 590 the VFD calibrates a pump model (e.g. a model based on the correlations) based on the deviations to compensate future predictions for existing wear.

In one variation, the impact of wear on the torque and head/pressure relationship remains substantially constant which negates the need for early correction of the torque/head relationship. During this period, which may be the entire life time of the system, depending on the wear rate of the particular application, the system can operate without correction to the initial model.

In another embodiment, two parameters are correlated to predict system changes. In the present embodiment, a first parameter and a second parameter are correlated. The first parameter and the second parameter vary over time. Exemplary first and second parameters include current, torque, speed, water level, and any other parameter included in the pump model. Then, a prediction is made for the first parameter based on a perturbation of the second parameter and the correlation. For example, the perturbation may be increasing the second parameter by 10% for one minute, and the prediction may be a change in fluid level. The second parameter is then perturbed, and the value of the first parameter is measured with a transducer. The method proceeds by detecting a system change based on a difference between the predicted value and the measured value of the first parameter. The difference between the predicted and the measured values may be referred to as the error. A large error is indicative of a system change. Error is large if is greater than an average error computed over time. For example, statistical limits can be determined from the error variation, e.g. +/−3 sigma, and the error may be deemed large if it exceeds the statistical limits. The error may be large if it exceeds a predetermined value configured to set a sensitivity to system change. In one example, the system change includes at least one of fluid level, fluid density and pump wear.

In one variation, the first parameter is a fluid parameter of a liquid, the second parameter is the pump speed, and the system change comprises loss of a credible transducer signal.

In another embodiment, a torque indicator selected from torque, current and power is monitored to detect a torque fault, such as dry-running. The method begins with driving a pump with a motor coupled to a variable frequency drive and determining the torque indicator. Driving the pump includes starting the motor. During the start-up period, torque, current and power are typically higher than normal. Then the variables settle. After the variables settle, a fault calibration period begins. During the fault calibration period, the torque indicator is determined to determine a baseline and set a fault threshold based on the baseline. The baseline may be an average of the torque indicator obtained during the calibration period or it may be an ongoing running average. The fault threshold may be a percentage of the baseline, such as 150%. After the fault threshold is set, a fault is detected if the value of the torque indicator exceeds the fault threshold. The value may be determined by measuring and averaging successive instantaneous values for a predetermined time or a predetermined number of instantaneous values so as to prevent false positives (e.g. a single instantaneous value). The predetermined time or number of instantaneous values should be large enough to prevent false positives but small enough to detect faults in appropriate circumstances. If damage results in 5 seconds, for instance, the predetermined time might be less than 1 second, and preferably less than 0.5 seconds. Thus, a fault is triggered when the torque indicator changes sufficiently or sufficiently fast relative to the baseline. In one example, the fault threshold is between about 130% and 170% of the baseline. In another example, the fault threshold is between about 140% and 160% of the baseline. In another example, the torque indicator comprises a rate of change of the torque indicator. In another example, the baseline is determined after each start-up period.

In one variation, the method further comprises discontinuing operation of the pump upon detecting the fault. In other words, infer that the high torque, power or current, or the high first derivative of the torque, power or current, indicate dry-running, and stop the pump before it becomes damaged. The torque, power or current should be checked frequently relative to the time required to damage the pump. In one variation of the present embodiment, the pump is a progressive cavity pump. In one example of the present variation, the risk period is less than 10 seconds. In another example of the present variation, the risk period is less than 5 seconds.

In another variation of the present embodiment, the torque is proportional to head pressure and pump speed is proportional to flow.

In a further embodiment, once the torque indicator exceeds a limit greater than the baseline but lower than the torque indicator threshold, a stall condition is identified if the pump operates at the reduced speed for a predetermined time.

Figure 6:
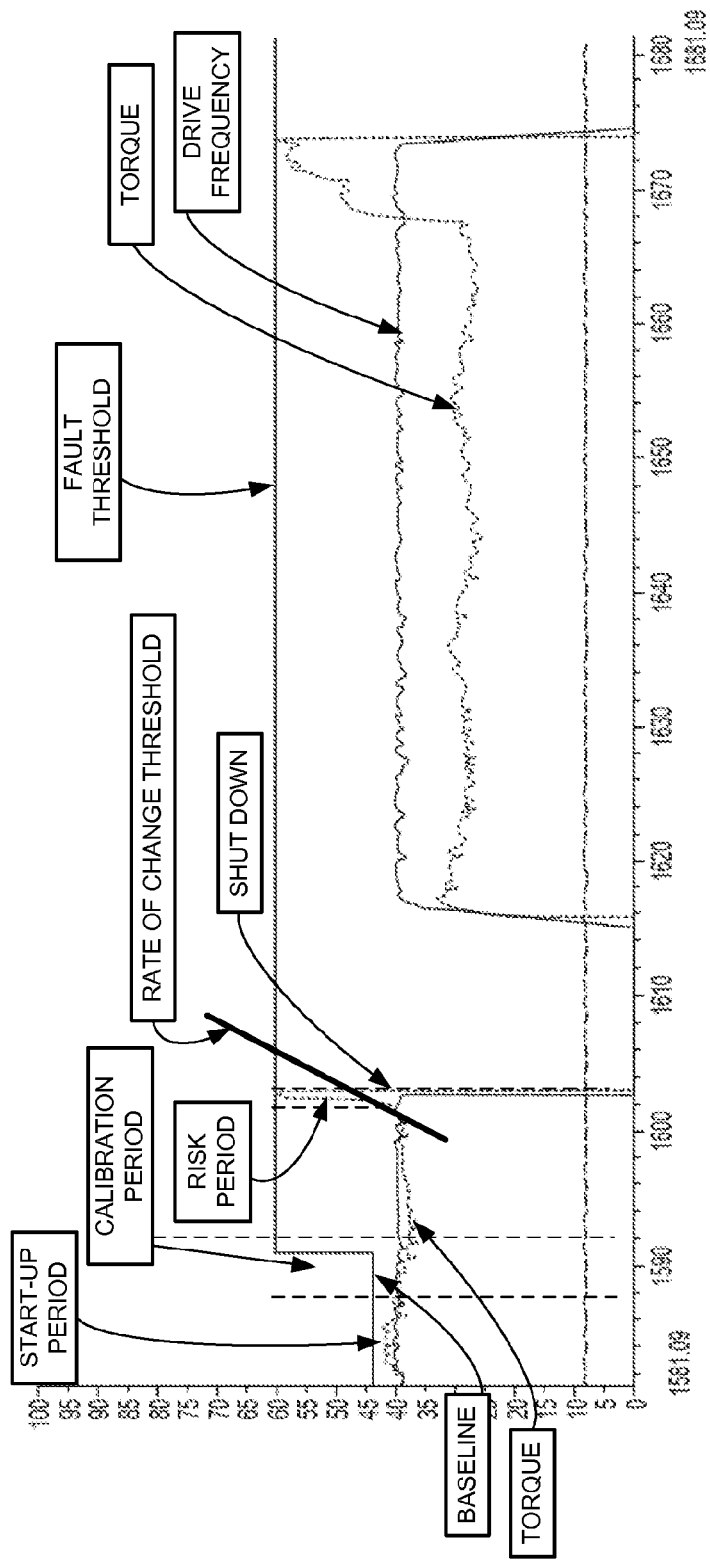
FIG. 6 is a graph of torque (parameter) drawn by a pumping system's motor and frequency supplied to the motor illustrating a control strategy in accordance with a further embodiment set forth in the disclosure.

The foregoing method will now be illustrated with reference to FIG. 6, in which there is shown a graph representing a parameter as a percentage of its range, over time. The time base is in seconds. A start-up period is shown, lasting about 2 seconds. The calibration period (~2.5 seconds) starts after the start-up period. Thereafter, the fault threshold is set (~60 percent, or 15% above the baseline. A fault is detected when the parameter exceeds the fault threshold. The risk period, beginning when the parameter starts to rise and ending when the pump is shut down, is shown to be about 1 second. A rate of change threshold is shown as a straight line whose slope corresponds to a parameter change over a period of time. The line is shown for illustrative purposes only. In the present graph the fault is triggered by the value of the parameter and not the rate of change. In the present example, the pump is restarted after a few seconds, and the baseline is not reset. A second fault is shown about 60 seconds later.

As used herein, processing instructions include a single application, a plurality of applications, one or more programs or subroutines, software, firmware, and any variations thereof suitable to execute instruction sequences with a processing device.

As used herein, a processing or computing system or device may be a specifically constructed apparatus or may comprise general purpose computers selectively activated or reconfigured by software programs stored therein. The computing device, whether specifically constructed or general purpose, has at least one processing device, or processor, for executing processing instructions and computer readable storage media, or memory, for storing instructions and other information. Many combinations of processing circuitry and information storing equipment are known by those of ordinary skill in these arts. A processor may be a microprocessor, a digital signal processor (DSP), a central processing unit (CPU), or other circuit or equivalent capable of interpreting instructions or performing logical actions on information. A processor encompasses multiple processors integrated in a motherboard and may also include one or more graphics processors and embedded memory. Exemplary processing systems include workstations, personal computers, portable computers, portable wireless devices, mobile devices, and any device including a processor, memory and software. Processing systems also encompass one or more computing devices and include computer networks and distributed computing devices.

As used herein, a non-transitory computer readable storage medium comprises any medium configured to store data, such as volatile and non-volatile memory, temporary and cache memory and optical or magnetic disk storage. Exemplary storage media include electronic, magnetic, optical, printed, or media, in any format, used to store information. Computer readable storage medium also comprises a plurality thereof.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component.

The above detailed description of the invention and the examples described therein have been presented only for the purposes of illustration and description. While certain examples were described with reference to CBM/CSG applications, the invention is not so limited. Various forms of pumping equipment may be used in accordance with the disclosed embodiments to move fluids from wells and other sources to a targeted alternative location. Examples of such applications include water, oil, water mixed with gas, irrigation systems, oil mixed with water, waste water, water treatment, chemicals and any other system in which pumps are used to move liquids. It is therefore contemplated that the present invention cover any and all modifications, variations or equivalents that fall within the spirit and scope of the basic underlying principles disclosed above and claimed herein.

What is claimed is:

1. A pumping system comprising: a variable frequency drive adapted to drive a pump with a motor, the variable frequency drive including a processor and a non-transitory computer readable medium having embedded therein processing instructions configured to perform a method when executed by the processor, the method including:
    determining a torque indicator comprising one of torque, motor power or motor current;
    determining the torque indicator during a fault calibration period to determine a baseline;
    setting a fault threshold based on the baseline;
    after setting the fault threshold, detecting a fault if the torque indicator exceeds the fault threshold;
    reducing pump speed if the torque indicator exceeds a limit greater than the baseline but lower than the fault threshold; and
    identifying a stall condition if the pump operates at the reduced speed for a predetermined time.

2. A pumping system as in claim 1, wherein the fault threshold is between about 130% and 170% of the baseline.

3. A pumping system as in claim 1, wherein the fault threshold is between about 140% and 160% of the baseline.

4. A pumping system as in claim 1, wherein the torque indicator comprises a rate of change.

5. A method for operating a pumping system with a variable speed drive including a processor and a non-transitory computer readable medium having embedded therein processing instructions configured to perform the method when executed by the processor, the method comprising:
    driving a motor and a pump coupled with the motor;
    determining a torque indicator comprising one of torque, motor power or motor current, wherein the torque is proportional to head pressure and pump speed is proportional to flow;
    determining the torque indicator during a fault calibration period after a start-up period to determine a baseline;
    setting a fault threshold based on the baseline;
    after setting the fault threshold, detecting a fault if the torque indicator exceeds the fault threshold; and
    reducing, a pump speed responsive to detecting the fault.

6. A method as in claim 5, wherein the fault threshold is between about 130% and 170% of the baseline.

7. A method as in claim 5, wherein the fault threshold is between about 140% and 160% of the baseline.

8. A method as in claim 5, wherein the torque indicator comprises a rate of change.

9. A method as in claim 5, wherein the baseline is determined after each start-up period.

10. A method as in claim 5, further comprising discontinuing operation of the pump upon detecting the fault.

11. A method for operating a pumping system with a variable frequency drive including a processor and a non-transitory computer readable medium having embedded therein processing instructions configured to perform the method when executed by the processor, the method comprising:
    driving a motor and a pump coupled with the motor;
    determining a torque indicator comprising one of torque, motor power or motor current;
    determining the torque indicator during a fault calibration period to determine a baseline;
    setting a fault threshold based on the baseline;
    after setting the fault threshold, detecting a fault if the torque indicator exceeds the fault threshold,
    wherein the torque is proportional to head pressure and pump speed is proportional to flow; and
    discontinuing operation of the pump upon detecting the fault.

12. The method of claim 11, wherein the fault threshold is between about 130% and 170% of the baseline.

13. The method of claim 11, wherein the torque indicator comprises a rate of change.

14. The method of claim 11, wherein determining the torque indicator during a fault calibration period is performed after every start-up period.

15. A method for operating a pumping system with a variable frequency drive including a processor and a non-transitory computer readable medium having embedded therein processing instructions configured to perform the method when executed, by the processor, the method comprising:
   driving a motor and a pump coupled, with the motor;
   determining a torque indicator comprising one of torque, motor power or motor current;
   determining the torque indicator during a fault calibration period to determine a baseline;
   setting a fault threshold based on the baseline;
   after setting the fault threshold, detecting a fault if the torque indicator exceeds the fault threshold;
   reducing pump speed if the torque indicator exceeds a limit greater than the baseline but lower than the fault threshold; and
   identifying a stall condition if the pump operates at the reduced speed for a predetermined time.

16. The method of claim 15, wherein the fault threshold is between about 130% and 170% of the baseline.

17. The method of claim 15, wherein the torque indicator comprises a rate of change.

18. The method of claim 15, wherein determining the torque indicator during a fault calibration period is performed after every start-up period.

19. A pumping system comprising: a variable frequency drive adapted to drive a pump with a motor, the variable frequency drive including a processor and a non-transitory computer readable medium having embedded therein processing instructions configured to perform a method when executed by the processor, the method including:
   determining a torque indicator comprising one of torque, motor power or motor current, wherein the torque is proportional to head pressure and pump speed is proportional to flow;
   determining the torque indicator during a fault calibration period to determine a baseline;
   setting a fault threshold based on the baseline;
   after setting the fault threshold, detecting a fault if the torque indicator exceeds the fault threshold; and
   reducing a pump speed responsive to detecting the fault.

20. The pumping system of claim 19, wherein the fault threshold is between about 130% and 170% of the baseline.

21. The pumping system of claim 20, wherein the fault threshold is between about 140% and 160% of the baseline.

22. The pumping system of claim 19, wherein the torque indicator comprises a rate of change.

23. The pumping system of claim 19, wherein determining the torque indicator during a fault calibration period is performed after every start-up period.

* * * * *